United States Patent [19]

Yoshida

[11] Patent Number: 4,609,927
[45] Date of Patent: Sep. 2, 1986

[54] IMAGE RECORDING APPARATUS WITH DIVIDED MEMORY

[75] Inventor: Tadashi Yoshida, Tokyo, Japan

[73] Assignee: Canon Kabushiki Kaisha, Tokyo, Japan

[21] Appl. No.: 508,331

[22] Filed: Jun. 27, 1983

[30] Foreign Application Priority Data

Jul. 9, 1982 [JP] Japan .................................. 57-118499

[51] Int. Cl.⁴ ..................... G01D 15/06; H04H 1/23; H04H 1/40
[52] U.S. Cl. ................................... 346/154; 358/300; 358/260
[58] Field of Search ............... 346/150, 153.1, 154, 346/160, 162, 74.2, 107 R, 76 PH; 358/300, 301, 302, 260, 134

[56] References Cited

U.S. PATENT DOCUMENTS

| | | |
|---|---|---|
| 4,000,495 | 12/1976 | Pirtle .......................... 346/107 R X |
| 4,074,319 | 2/1978 | Goldschmidt et al. ............. 358/230 |
| 4,262,309 | 4/1981 | Yamaguchi et al. ................ 358/260 |
| 4,455,578 | 6/1984 | Fearnside ........................... 358/302 |

OTHER PUBLICATIONS

"Thermal Printer Provides Hardcopy at 100 CHAR/S from CRTs", Computer Design, vol. 16, No. 10, Oct. 77, pp. 38 and 42.

*Primary Examiner*—E. A. Goldberg
*Assistant Examiner*—Patrick W. Foster
*Attorney, Agent, or Firm*—Fitzpatrick, Cella Harper & Scinto

[57] ABSTRACT

An image recording apparatus capable of responding to high-speed input image signals by dividedly storing image signals of a line into plural memory units, for parallel output, for example, thus achieving higher speed of signal storage than the speed of signal readout.

5 Claims, 4 Drawing Figures

IMAGE RECORDING APPARATUS WITH DIVIDED MEMORY

BACKGROUND OF THE INVENTION

1. Field of the Invention

The present invention relates to an image recording apparatus for effecting image recording in response to input image signals.

2. Description of the Prior Art

Recording apparatus equipped with plural recording elements such as light-emitting diodes, liquid crystal display elements or needle electrodes has been recently employed as an output unit for facsimile reception or for computer. As an example of such apparatus, FIG. 1 shows an electrostatic recording apparatus equipped with needle electrodes, wherein an electroconductive drum 1 provided with a dielectric surfacial layer is surrounded by a primary charger 2 for uniformly charging said dielectric layer positively; a stylus head 3 provided with plural needle electrodes arranged in the axial direction of said drum over the entire width thereof for applying a negative voltage to said positively charged dielectric layer to form an electrostatic latent image thereof; a developing station 4 for developing said electrostatic latent image on means of dielectric layer into a visible image by the toner deposition; a transfer charger 5 for transferring thus formed toner image onto a recording sheet 7; and a cleaning station 6 for removing the toner remaining on the dielectric layer after image transfer.

In such apparatus the drum 1 is rotated in the direction indicated by an arrow at a constant speed, and a positive voltage of several hundred volts is supplied to the primary charger 2 to uniformly charge said dielectric layer to a positive potential. Image signals representing characters, symbols, patterns, etc., obtained as facsimile reception signals or as computer output signals are converted, in a stylus driver 11, into negative pulse voltages of several hundred volts and supplied to the needle electrodes of the stylus head 3, thereby eliminating the positive charge in the positions corresponding to such characters, symbols or patterns, thus forming an electrostatic latent image. Upon further rotation of the drum 1 as indicated by the arrow, the electrostatic latent image is developed into a visible image in the developing station 4 by the deposition of toner particles, for example from a magnetic brush, charged to a polarity opposite to that of the latent image. Subsequently said visible image is rotated to the position of the transfer charger 5, where the visible image is transferred, by means of corona discharge, onto the recording sheet 7 supplied by a feed roller 8 and transport rollers 10. Then the recording sheet 7 is transferred to fixing rollers 9 for fixing said transferred image onto the recording sheet 7 under heat and pressure, and the drum 1 is subjected to the removal of remaining toner in the cleaning station 6 in order to prepare said drum for the succeeding recording cycle.

As shown in FIG. 2, the stylus head 3 is provided with a plurality of needle electrodes 2-1 arranged at a density of 4 to 16 electrodes/mm in order to achieve recording of high resolution. For achieving simultaneous recording with such high-density stylus head 3, for example over a short end of B4 size ($256 \times 364$ mm), there will be required 4096 needle electrodes at a density of 16 electrodes/mm. Formation of an electrostatic latent image by supplying negative pulse voltages in the order from $-200$ to $-300$ volts to the needle electrodes of such large number requires an enormous number of high-voltage transistors and latch circuits.

Consequently it has recently been common to employ plural units of a high-voltage resistant MOS-IC which can be directly connected to TTL circuits and incorporates, as shown in FIG. 3, a shift register 3-1, a latch circuit 3-2, several tens of AND gates 3-3-1–3-3-n and high-voltage MOS field effect transistors 3-4-1–3-4-n, with the operating procedure as described in the following.

Time-sequential image signals are supplied from a data input terminal DIN(1) and stored in the shift register 3-1 driven by clock signals supplied from a clock input terminal CK(2). After said storage, said signals are read in parallel manner, stored in the latch circuit 3-2 driven by a latch signal supplied from a latch input terminal LS(4), then again read in parallel manner and supplied to the high-voltage MOSFET 3-4-1–3-4-n through the AND gates 3-3-1–3-3-n, thereby obtaining high-voltage output image signals from output terminals OUT(6)–OUT(n+5) in parallel manner. The image signals from the shift register 3-1 can be read, when required, from a data output terminal DOUT(3). Also said AND gates are opened by a clear signal from an input terminal CL(5) and intercept the transmission of image signals when they are not needed.

Such high-voltage resistant MOS-IC may contain 8 to 32 units of MOSFET's as an integrated circuit, but, in order to drive 4096 needle electrodes provided at a density of 16 electrodes/mm on the stylus head 3 for B4 size recording, there will be required 128 units of such MOS-IC, each incorporating 32 integrated MOSFET's, to be serially connected.

However the signal processing speed of such MOS-IC is significantly lower than that of TTL circuits and can be in the order of 4 MHz at maximum. At the signal processing speed of 4 MHz, the time required for entering the serial image signals of a line into thus serially connected MOS-IC's for driving the stylus head with 4096 needle electrodes will be:

$$4096 \times \tfrac{1}{4} \text{ MHz} = \text{ca. 1 msec.}$$

which therefore results in a time of ca. 1.5 milliseconds per line in consideration of the driving time required for FET's. Thus the recording of B4 size, including 5824 lines in the longer side at a density of 16 lines/mm, will require 1.5 msec. $\times 5824 = 8.7$ seconds. For this reason a high-speed recording cannot be expected with the conventional technology.

Also in the recording apparatus of other types, an increase in the quantity of image signals per line leads to an increase in the time required for the entry of image signals for driving the recording elements, thus giving rise to a loss in the recording speed or to a loss in the output speed of image signals according to the recording speed of said recording apparatus.

SUMMARY OF THE INVENTION

In consideration of the foregoing, an object of the present invention is to provide an image recording apparatus capable of achieving an improved image recording speed.

Another object of the present invention is to provide an image recording apparatus capable of image recording without reducing the input speed of the image signals.

Still another object of the present invention is to provide an image recording apparatus capable of image signal processing adapted to image recording with plural recording elements.

The foregoing and still other objects of the present invention, as well as the advantages resulting therefrom will be made fully apparent from the following description.

DESCRIPTION OF THE PREFERRED EMBODIMENTS

Now the present invention will be clarified in detail by the following description to be taken in conjunction with the attached drawings.

Figure 1:
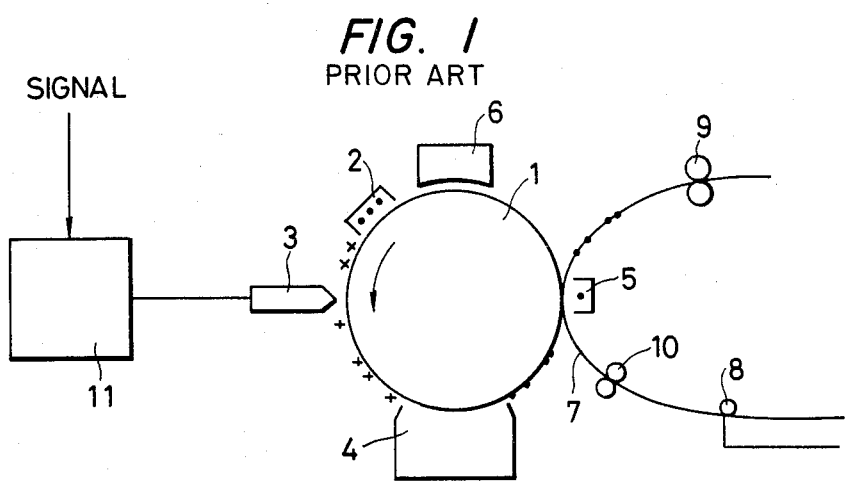
FIG. 1 is a schematic view of a recording apparatus in which the present invention can be employed.
Figure 2:
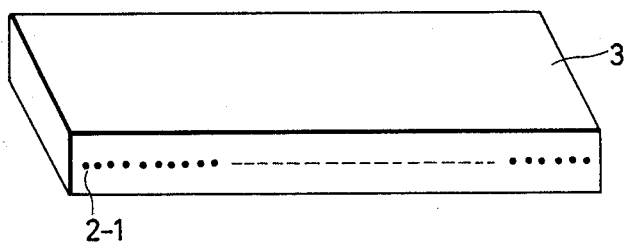
FIG. 2 is a schematic perspective view showing the structure of a stylus head in the apparatus of FIG. 1.
Figure 3:
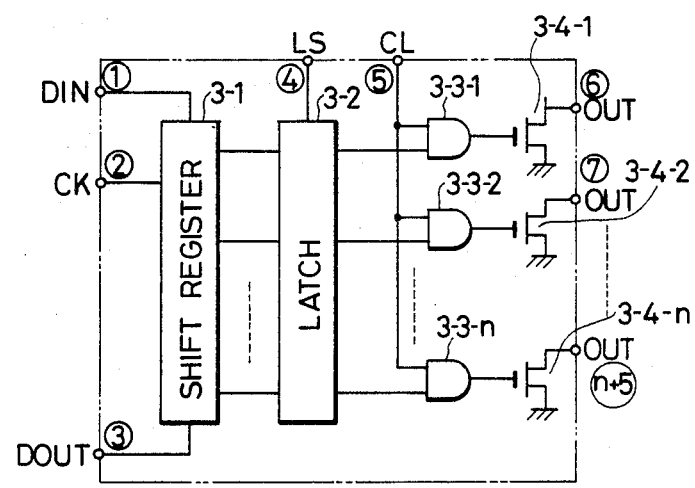
FIG. 3 is a block diagram of a driving circuit for the stylus head of FIG. 2.
Figure 4:
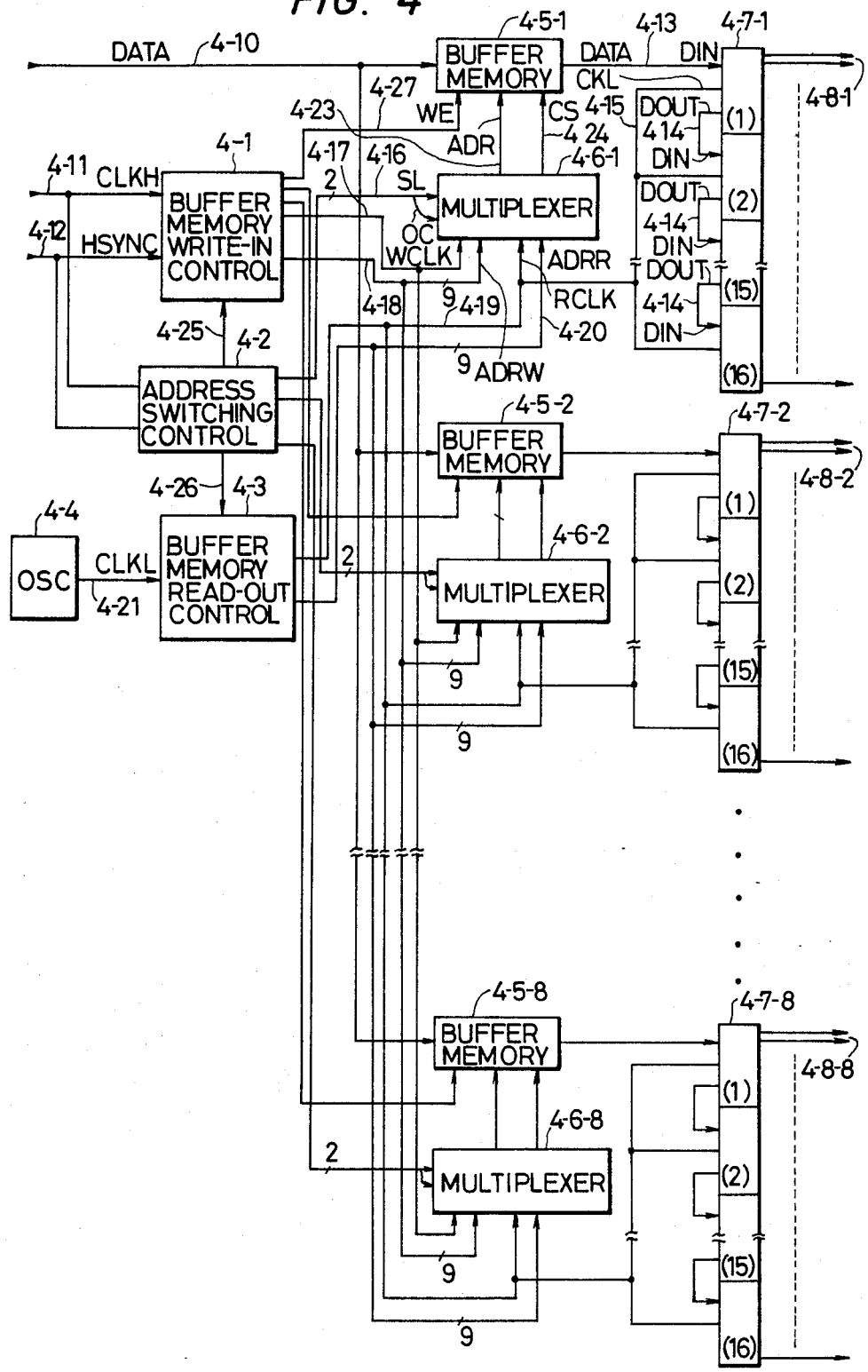
FIG. 4 is a block diagram showing a driving circuit for use in the recording apparatus of the present invention.

FIG. 4 shows the circuit structure of the present invention applied to an electrostatic recording apparatus employing needle electrodes. In FIG. 4, there are shown a buffer memory write-in control unit 4-1; an address switching control unit 4-2; a buffer memory read-out control unit 4-3; an oscillator 4-4; buffer memories 4-5-1 through 4-5-8 respectively of a capacity of 512 bits; multiplexers 4-6-1 through 4-6-8; and MOS-IC blocks 4-7-1 through 4-7-8, each composed of a determined number of MOS-IC's incorporating shift registers, latch circuits, etc., as shown in FIG. 3. In the illustrated circuit it is assumed that the stylus head has 4096 needle electrodes which are divided into 8 blocks, so that 32×16=512 needle electrodes are provided for each MOS-IC block. Each of the MOS-IC blocks 4-7-1 through 4-7-8 contains 16 MOS-IC's each integrating 32 high-voltage MOSFET's 3-4-1 through 3-4-n (n=32) shown in FIG. 3, and such 16 MOS-IC's are serially connected by making connections between the data output terminal DOUT(3) and the input terminal DIN(1) of neighboring MOS-IC's as represented by 4-14 to obtain 32×16=512 output signals from each MOS-IC block.

Such recording apparatus externally receive image data signals (DATA) 4-10, clock signals (CLKH) 4-11 and horizontal synchronizing signals (HSYNC) 4-12. Said horizontal synchronizing signals (HSYNC) 4-12 represent the effective period for image data in a line consisting of 4096 bits, while the image data signals (DATA) 4-10 are time-sequential image signals of 4096 bits which are supplied and stored in succession into the buffer memories 4-5-1 through 4-5-8 respectively of 512 bits in response to the clock signals (CLK) 4-11 for example of a frequency of 20 MHz synchronized with said input image data signals. Upon such storage of the image data signals (DATA) 4-10, the buffer memories 4-5-1–4-5-8 are driven by clock signals (CLKL) 4-21 for example of a frequency of 2.5 MHz supplied from an incorporated oscillator (OSC) 4-4 to supply the image data signals (DATA) 4-10, stored in the buffer memories 4-5-1–4-5-8, in succession to the image signal input terminals DIN of the MOS-IC blocks 4-7-1 through 4-7-8 through a data line 4-13. Each of the MOS-IC blocks 4-7-1–4-7-8 stores image data signals (DATA) 4-10 in succession into 16 shift registers in synchronization with the clock signals (CLKL) of 2.5 MHz, then, after storage of said image data signals (DATA) 4-10 of 512 bits, reads said signals in a parallel manner, latches said signals in the latch circuit and supplies said signals to the MOS-FET's for recording. It is therefore rendered possible to obtain image signals at a higher rate, than in the case of serially entering the sequential image data signals into the eight MOS-IC blocks, by entering the image data signals (DATA) 4-10 into the buffer memories 4-5-1 through 4-5-8 in synchronization with the high-speed clock signals (CLKH) 4-11 of 20 MHz and reading said buffer memories in succession in synchronization with the low-speed clock signals (CLKL) 4-15 of 2.5 MHz.

Now there will be given an explanation of the functions of entering and reading the image data signals to and from the buffer memories 4-5-1 through 4-5-8. At first, at the start of the horizontal synchronizing signal (HSYNC) 4-12, the address switching control unit 4-2 supplies a write-in start signal 4-25 to the buffer memory write-in control unit 4-1 to initiate the function thereof. Thus buffer memory write-in control unit 4-1 supplies write-in clock signals (WCLK) 4-17 and write-in address signal (ADRW) 4-18 through multiplexers 4-6-1 through 4-6-8 to the buffer memories 4-5-1 through 4-5-8 to select said buffer memories in succession, whereby the image data signals (DATA) 4-10 are stored in succession, through the signal line 4-10, in said buffer memories 4-5-1 through 4-5-8. The write-in clock signals (WCLK) 4-17 are generated in synchronization with the high-speed clock signals (CLKH) 4-11, and supplied to the buffer memories 4-5-1 through 4-5-8 after selection by the multiplexers 4-6-1 through 4-6-8. Also the write-in address signals (ADRW) 4-18 selects the addresses from "0" to "511" in synchronization with the write-in clock signals (WCLK) 4-17 through a 9-bit line, thus causing the image data signals (DATA) 4-10 of 512 bits to be stored in succession in the buffer memories 4-5-1 through 4-5-8. Each of the buffer memories 4-5-1 through 4-5-8 receive a write-in enable signal (WE) 4-27 from the buffer memory write-in control unit 4-1 in synchronization with chip selecting signals (CS) 4-24 from the multiplexers 4-6-1 through 4-6-8, and the write-in operation into each of the buffer memories 4-5-1 through 4-5-8 is selected by a 2-bit selection signal (SL, OC) 4-16 from the address switching control unit 4-2. Said selection signal (SL, OC) 4-16 performs the selection in the following manner in which active state and non-active state are respectively represented by "1" and "0":

|  | No selection | Write-in selected | Read-out selected |
|---|---|---|---|
| Selection Signal (SL) | X | 0 | 1 |
| Output Control Signal (OC) | 0 | 1 | 1 |

More specifically, in case of writing the image data signals into the buffer memory 4-5-1 of the block 1, the address switching control unit 4-2 supplies the selection signal 4-16 (SL, OC)=(0, 1) to the multiplexer 4-6-1, whereby the write-in clock signal (WCLK) 4-17 is supplied as the chip selection signal (CS) 4-24 and the write-in address signal (ADRW) 4-18 is supplied as the address signal (ADR) 4-23.

Also the selection of the write-in and read-out in the buffer memory 4-5-1 is effected in the following manner:

|  | No selection | Memory write-in | Memory read-out |
|---|---|---|---|
| Write-in enable signal (WE) | X | 1 | 0 |
| Chip selection signal (CS) | 0 | 1 | 1 |

In the foregoing tables "X" stands for "no operation".

Thus, at the signal write-in to the memory, a write-in enable signal (WE) 4-27 is supplied in synchronization with the chip selection signal (CS).

Upon storage of the image data signals (DATA) 4-10 of 512 bits into the buffer memory 4-5-1 of the block 1, the address switching control unit 4-2 releases a selection signal (SL) to the multiplexer 4-6-2 of the block 2 to achieve signal write-in operation in the afore-mentioned manner.

On the other hand, after the completion of the signal write-in operation into the buffer memory 4-5-1 of the block 1, the address switching control unit 4-2 shifts the multiplexer 4-6-1 of the block 1 to the signal read-out state. More specifically, a selection signal (SL) 4-16 is released in a state (SL, OC)-(1, 1) whereby the buffer memory read-out control unit 4-3 supplies, in response to the read-out start signal 4-26, the read-out clock signals (RCLK) 4-19 and the read-out address signals (ADRR) 4-20 to the multiplexer 4-6-1. Said read-out clock signals (RCLK) 4-19 are of a frequency of 2.5 MHz synchronized with the low-speed clock signals (CLKL) 4-21 supplied from the oscillator (OSC) 4-4, while the read-out address signal (ADRR) 4-20 is utilized for reading the image data signals from the addresses from "0" to "511" in the same manner as in the signal write-in operation, and the write-in enable signal (WE) 4-27 remains at the level "0" during such signal read-out operation.

In the above-described manner the image data signals in the buffer memory 4-5-1 are supplied, through a data line 4-13, to the image data input terminal of the MOS-IC block 4-7-1. The clock signals for driving the shift register of said block 4-7-1 are, as explained before, low-speed clock signals of a frequency of 2.5 MHz synchronized with the read-out clock signals (RCLK) 4-19.

As explained in the foregoing, the buffer memories 4-5-1 through 4-5-8 are switched in succession to perform the operations of signal write-in and signal read-out, whereby the image data signals (DATA) 4-10 are cyclically read in the order to signal write-in, thus storing said image data signals (DATA) 4-10 in succession in the shift registers of the MOS-IC blocks 4-7-1 through 4-7-8.

The image data signals of 4096 bits, corresponding to a line, are supplied, after storage in the shift registers of the MOS-IC blocks 4-7-1 through 4-7-8, as the stilus driving output signals 4-8-1–4-8-8 by the latch action as shown in FIG. 3. The time required for storing the 4096 image data signals of 4096 bits of a line in the shift registers of the MOS-IC blocks 4-7-1 through 4-7-8 is equal to the sum of the buffer memory write-in time (1/20 MHz×512×8=205 μs) and the shift time in the MOS-IC of a block (1/2.5 MHz×512=205 μs), namely equal to 410 μs.

On the other hand, the time required for shifting the image data signals of 4096 bits in the mere serial connection of the MOS-IC blocks 4-7-1 through 4-7-8 is equal to 1/2.5 MHz×4096=1638 μs. Consequently the circuit structure shown in FIG. 4 allows to obtain the stilus driving signals approximately four times faster.

The above-mentioned effect of speed increase becomes larger if the number of divisions of MOS-IC blocks is increased further.

As explained in the foregoing, the present invention provides an effect of enabling real-time recording of relatively high-speed image signals.

Although the foregoing embodiment is limited to the electrostatic recording apparatus employing needle electrode, the present invention is also applicable to other recording apparatus such as electrostatic recording apparatus utilizing an optical shutter composed for example of liquid crystal unit or a light-emitting element such as light-emitting diode, or a thermal recording apparatus or an ink jet recording apparatus.

What is claimed is:

1. An image recording apparatus comprising:

first memory means having a plurality of memory units each adapted for storing image signals representative of a predetermined amount of image information;

means for controlling storage of a line of image signals serially incoming into said first memory means in such a manner that said plurality of memory units are sequentially selected each to store image signals corresponding to said predetermined amount of image information;

recording means having a plurality of recording elements arranged in a line configuration for recording an image on a recording material on a line by line basis;

second memory means having a plurality of shift registers each adapted for storing said predetermined amount of image information read out serially from the associated one of said plurality of memory units and for outputting in parallel the stored image signals carrying said image information stored in said shift registers; and driving means having a plurality of driving units each adapted for driving a predetermined number of said plurality of recording elements to record said predetermined amount of image information received in parallel from the associated one of said plurality of shift registers, said plurality of driving units being simultaneously operable, wherein said storage controlling means is for causing storage of said image signals in said memory units to be conducted at a speed higher than that with which signals are read-out from said memory units.

2. An image recording apparatus comprising:

first memory means having a plurality of memory units each adapted for storing image signals representative of a predetermined amount of image information;

means for controlling storage of a line of image signals serially incoming into said first memory means in such a manner that said plurality of memory units are sequentially selected each to store image signals corresponding to said predetermined amount of image information;

recording means having a plurality of recording elements arranged in a line configuration for recording an image on a recording material on a line by line basis;

second memory means having a plurality of shift registers each adapted for storing said predetermined amount of image information read out serially from the associated one of said plurality of memory units and for outputting in parallel the stored image signals carrying said image information stored in said shift registers; and driving means having a plurality of driving units each adapted for driving a predetermined number of said plurality of recording elements to record said predetermined amount of image information received in parallel from the associated one of said plurality of shift registers, said plurality of driving units being simultaneously operable, wherein said first memory means stores the image signals in accordance with first clock signals in synchronism with the entrance of the image signals into said apparatus, and the image signals stored therein are read out therefrom in accordance with second clock signals different from said first clock signals.

3. An image recording apparatus according to claim 1 or 2, wherein said recording means has a plurality of stylus electrodes as said plurality of recording elements.

4. An image recording apparatus according to claim 1 or 2, wherein said control means is adapted to select a memory unit for storing said image signals by counting clock signals for image signal storage.

5. An apparatus according to claim 1 or 2, wherein said recording means performs image recording, after completion of storage of a line of image signals in said second memory means, of the image of the corresponding line.

* * * * *